US010303452B2

(12) United States Patent
Zamir et al.

(10) Patent No.: US 10,303,452 B2
(45) Date of Patent: May 28, 2019

(54) APPLICATION MANAGEMENT IN ENTERPRISE ENVIRONMENTS USING CLOUD-BASED APPLICATION RECIPES

(71) Applicant: VMware, Inc., Palo Alto, CA (US)

(72) Inventors: Tal Zamir, Haifa (IL); Shlomo Wygodny, Herzliya (IL); Dan Ilan, Tel Aviv (IL)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/653,467

(22) Filed: Jul. 18, 2017

(65) Prior Publication Data

US 2017/0315794 A1 Nov. 2, 2017

Related U.S. Application Data

(63) Continuation of application No. 14/720,050, filed on May 22, 2015, now Pat. No. 9,727,324.

(51) Int. Cl.
*G06F 9/44* (2018.01)
*G06F 8/61* (2018.01)

(52) U.S. Cl.
CPC .................... *G06F 8/61* (2013.01)

(58) Field of Classification Search
None
See application file for complete search history.

(56) References Cited

U.S. PATENT DOCUMENTS

| 2004/0143830 | A1 | 7/2004 | Gupton |
| 2005/0132359 | A1 | 6/2005 | McGuire |
| 2014/0007075 | A1* | 1/2014 | Sporkert ............... G06F 8/68 717/173 |

* cited by examiner

*Primary Examiner* — Qamrun Nahar

(57) ABSTRACT

A cloud-based system is described for producing application deltas based on application recipes that identify components of the application deltas using unique identifiers, without the recipe containing all or any content of the actual application. The application recipe can be conveyed to an organization operating on an enterprise network, where the application recipe can be matched with application files in the organization's backup storage containing copies of content of endpoint devices on the network to retrieve components identified by the recipe and produce the application delta for the application. Subsequently, the application delta can be used as an installation package to perform IT operations such as installing the application on endpoint devices.

20 Claims, 5 Drawing Sheets

APPLICATION MANAGEMENT IN ENTERPRISE ENVIRONMENTS USING CLOUD-BASED APPLICATION RECIPES

CLAIM OF PRIORITY

This application claims priority to and is a continuation of U.S. patent application Ser. No. 14/720,050, filed on May 22, 2015, entitled "APPLICATION MANAGEMENT IN ENTERPRISE ENVIRONMENTS USING CLOUD-BASED APPLICATION RECIPES", which is incorporated herein by reference in its entirety.

TECHNICAL FIELD

The present disclosure generally relates to techniques for distributing and managing software applications and application packages on endpoint devices in enterprise network environments and cloud computing environments.

BACKGROUND

Enterprise application management is one of the most challenging tasks for Information Technology (IT) departments of large organizations today. A typical IT department needs to manage large numbers of user devices, which can be spread over wide geographies, and contain a diversity of software applications and operating systems. In turn, the IT department needs to be able to carry out various tasks on the client devices, such as installing applications, performing back-ups, delivering upgrades, restoring devices, migrating users between computing devices and between different Operating Systems (OS), and fixing bugs or problems; all of which needs to be done quickly, efficiently, and with minimal interruption to users of the client devices on the network. Increasing complexity of software programs, frequent software updates, and limited resources compounds these difficulties.

Conventionally, applications are installed on a device by using an application installer, such as the Microsoft Installer file (MSI) or other such tool. The application installer typically contains a wizard to guide a user through a manual installation process, where the user specifies various configuration options for the application installation. This manual installation process is not always optimal within the context of a large enterprise. For example, when an IT department of a large organization wishes to distribute a new application to thousands of users, requiring each user to manually walk through the installation process can be quite burdensome and may often cause inconsistencies. Some installers are able to run in a non-interactive or "silent" mode, where the application is installed without user interaction, however, such silent installations still typically require some form of a configuration file, which specifies all of the parameters and configuration details of the application installation. Creating such configuration files and "application packages" that include the installer with the configuration file(s) that can be used across all the various devices in the enterprise is not a trivial task.

Many enterprises have adopted the use of electronic software distribution (ESD) systems and similar application management and delivery systems to aid IT departments. Such systems are intended to automate the distribution and management of applications on endpoint devices, thereby reducing or in some cases even eliminating direct involvement by IT personnel. The ESD system can automate tasks such as installing, upgrading, or fixing applications; however, they still require the creation of silent application packages, and the process of creating such packages can be tedious, complex, and labor intensive work. For example, a typical enterprise may utilize hundreds or even thousands of different applications, and manually creating application installation packages for all of them can take months of work. Further, the work of packaging applications may need to be repeated each time a new version of an operating system (OS) is released, making it the bottleneck for operating system migration projects. The long time needed to create the application packages is also a barrier for IT organizations that wish to deploy a new ESD system. A more efficient approach is desirable for managing applications and application packages in enterprise network environments.

DETAILED DESCRIPTION

Figure 1:
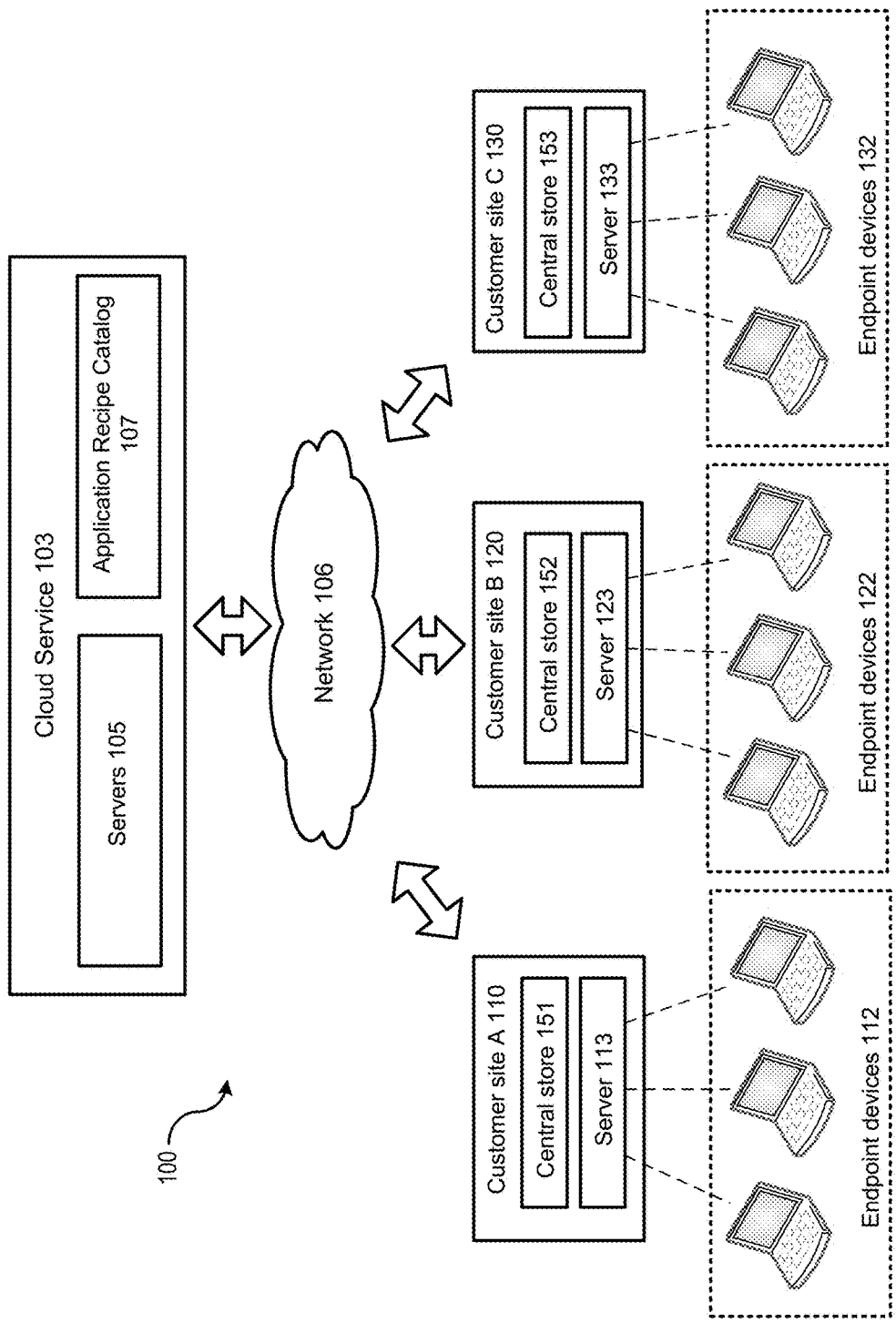
FIG. 1 illustrates an example environment for a cloud service interacting with several customer sites, in accordance with various embodiments.

Systems and methods in accordance with various embodiments of the present disclosure overcome at least some of the above mentioned shortcomings and deficiencies by providing more efficient ways to create application packages in enterprise environments. In particular, embodiments described herein leverage cloud-based "application recipes" in order to improve the efficiency of creating application packages that are used to manage applications in enterprise network environments.

Generally, the IT department of most enterprise organizations manages the applications used by the organization's employees. The IT department is responsible for determining the versions of the applications to be installed, distributing the applications to existing or new endpoints, upgrading or patching older versions, fixing broken applications, uninstalling undesired applications, etc. In most cases, the IT department creates or otherwise obtains application packages that are used in the installation process or for performing the various other IT functions. In some cases, end users can initiate some functions, such as application installation; for example, by using a self-service portal. However, even for self-service application installations, the application packages that are used in the installation process are provided by the IT organization.

The application distribution, or delivery, to the endpoint itself is typically done by an electronic software distribution (ESD) product. However, in the past, using these products required careful preparation and testing. As a prerequisite, the IT department generally needed to manually prepare an application package that includes the various files used by the application (binary files, configuration files, data files, etc.). In addition, the package includes all the changes done to the system, such as registry changes, driver repository changes, registering dynamic-link libraries, etc. This was typically done by running the application installer in "silent mode", where all the parameters of the installation are provided in a configuration file. Another option is to install the application (with the correct parameters) while recording system modifications by comparing the system image before and after the installation. A common middle-ground is to repackage the installer using tools, such as the Symantec Corporation Wise Package Studio, that help create a silent installer package that can be distributed by the ESD product.

However, all these methods are labor intensive and the generated packages require several rounds of meticulous testing and fixing. Generally, creating a single package can take an IT department several days. For example, the IT organization must find the installer files (which may be complicated for legacy apps) and determine how to supply the installation parameters silently. A large organization may have hundreds of applications managed by the IT department; accordingly, repackaging the applications and any new version can consume significant amounts of time and resources.

However, the majority of applications used by an enterprise organization are commercially available, as opposed to applications developed by an organization for its own internal use. Hence, similar work of repackaging an application may be repeated by numerous organizations. The application management system described herein discloses ways to use the packaging work that was done by one organization to produce a "recipe" for an application, which can be used by other organizations to produce packages for the application, in a fast, automated manner.

The systems described herein provide a cloud service that contains application recipes for a large catalog of applications and their various versions. This cloud service catalog can be automatically updated with recipes for the latest versions of applications and with new applications as they become available, without requiring manual IT work for each application. In various embodiments, organizations, persons or systems can connect to this cloud service to retrieve application recipes for applications. Based on the application recipes, application packages in the form of application deltas, as further described below, can be built/constructed automatically at the organization and the system can instantly and automatically populate the organization's local application catalog with all the applications that exist in their organization, without the need for any manual application package capture. This enables IT to deploy, fix, update, and perform other services with applications without any preliminary steps, as well as letting end users install applications in a self-service manner.

Application recipes in the cloud service can be created in various manners. For example, an organization that provides the cloud service can create recipes for commonly used commercial applications and upload them to the cloud service. Additionally, organizations that use the cloud service may upload application packages they created for use with an ESD product to the cloud service. The uploaded application packages can be converted in the cloud service to automatically generate application recipes.

As used herein, the term "silent installer" refers to an automatic installation package of an application that includes multiple files, directories, and a command line for silent (unattended) installation of the application. Silent installers include installation packages typically developed by IT departments of enterprise organizations to be used with the organization's ESD system for carrying out certain tasks in an automated manner, such as installation or updating of applications. For example, a silent installer may be a Microsoft Installer file (MSI) with a command line for silent installation or with silent installation parameters.

As used herein, the term "application identifier" refers to a unique identifier assigned to an application such that the application can be identified by reference to the application identifier. For example, an application identifier can include information such as the application name, application version, application product ID, application upgrade code, and OS version. In various embodiments, application identifiers may be identifiers that are part of the standard registration of applications in the Windows registry. When desired, or when some identification data is missing from an application, identifying information can be created to make an application identifier unique. For example, the checksum of an application's executable binaries can be generated and added to an application identifier to make it unique.

As used herein, the term "application delta" refers to the files, directories, registry entries, or any other operating system (OS) modifications (.NET assembly repository, SBS repository, driver library, etc.) that are written or modified on a computing device when a corresponding application is installed on the computing device. Merging the application delta onto a computing device delivers the changes to the file system, directories, registry entries, operating system, etc. indicated in the application delta onto the computing device and consequently installs the application without requiring execution of an installer or other involvement. Hence, an application delta can be used by organizations as an application package, or as part of an application package, to perform various IT tasks involving the corresponding application on endpoint devices. An example of an existing system that implements application deltas to install applications is the Mirage system by VMware, Inc.

In various embodiments, an application delta can be created by comparing a pre- and post-installation snapshot of a computing device (or a virtual machine) or by otherwise monitoring all changes performed to a computing device (or virtual machine) during installation of the application. For example, on a virtual machine, an application delta can be generated by capturing a pre-installation snapshot of the virtual machine; executing a silent installer associated with the application on the virtual machine; capturing a post-installation snapshot of the virtual machine; and comparing the pre-installation snapshot with the post-installation snapshot to identify all components that were modified by the silent installer. All or any of these modified components can constitute the application delta.

In various embodiments, when merging an application delta onto a computing device, the system can view the files, registry entries, and other operating system settings of the computing device and compare them to the files, registry entries, and other operating system settings in the application delta. Based on the comparison, the system can determine which files should be added to the computing device, which files should be deleted from the computing device, and/or which files on the computing device should be overwritten by files in the application delta. Similarly, based on the comparison, the system can determine which registry entries and other operating system settings should be changed in the merge. A draft of how the computing device desktop will look after the merge can be produced based on the comparison and the actual changes can be implemented to complete the merge when the user restarts the computing device. The files, registry entries and/or other system settings can be stored in a side folder and the changes can be implemented when the user restarts the computing device. In various embodiments, a merge may include moving some existing files aside and placing new files from the application delta instead of them, and similarly implementing other changes to the operating system settings. This methodology allows for modifications to be applied to the computing device seamlessly and with little interruption and downtime, as opposed to traditional methods such as executable installers, which can require the user to stop tasks, slow down the machine, and require manual assistance from the user or from IT administrators.

As used herein, the term "application recipe" refers to information that uniquely identifies each component that should be present in the application delta such that the application delta can be used for a full installation of an application on a computing device. In various embodiments, an application recipe can uniquely identify each component of an application delta, such that, by retrieving the identified components the system is able to produce an application delta based on the application recipe. For example, the components identified by the recipe may be any files, registry entries, dynamic-link libraries (DLLs), changes to the operating system, or any other component required by the application.

The application recipe itself might not include the actual contents of the files or registry entries of the application. This may be important to protect privacy and avoid licensing violations or infringement of intellectual property rights. For example, an application recipe can include a set of digital signatures, wherein each digital signature uniquely identifies a component, such as a file name or a registry entry, required for the full installation of the application, and wherein the application recipe does not include the contents of the file or the registry data. Digital signatures may be checksums or hash sums representing file names, registry entries, or other identification of OS modifications produced by an application during installation. For example, an application recipe can be generated from an application delta by calculating checksums (e.g. SHA1) of all the application file names, application registry key or value names, and the checksums of their corresponding content. Further, a unique application identifier can be part of an application recipe for application identification purposes. Thus, an application recipe can be a set of checksums for file, registry, and other OS modifications, along with the unique application identifier for the application.

As mentioned above, the actual content of the application components is still needed to produce an application delta. In most large enterprise environments, the content of the various endpoint devices is frequently backed up (e.g., daily, weekly, hourly, etc.) to a central storage for reasons of high availability, disaster recovery, user error, etc. In many cases, such a backup storage includes all of the user content, documents, application files, registry entries, libraries and other content collected from all endpoint devices across the entire organization. All of this content in the storage can be used by the application management system to generate an application delta based on an application recipe downloaded from the cloud-based service. For example, an administrator may use an application management system to download an application recipe from the cloud based service, access the central storage, determine whether all of the components (i.e., files, registry entries, etc.) necessary to execute the application are available in the storage, and retrieve the components to produce the application delta. Any of these functions can be performed by the system automatically. The application delta can then be utilized as a package distributed to various other end user devices, where it can be merged onto the device in order to install the application on the device or to perform other functions.

FIG. 1 illustrates an example environment for a cloud service interacting with several customer sites, in accordance with various embodiments. As illustrated in the example of FIG. 1, an environment 100 includes a cloud service 103 connected to customer sites 110, 120, 130 through a network 106. Each customer site (e.g., 110, 120, 130) can be an organization, enterprise or department that centrally manages a plurality of respective endpoint devices 112, 122, 132. For example, customer site A 110 can manage endpoint devices 112 through a central management server 113 that communicates with each of the endpoint devices 112 via a network. Similarly, customer site B 120 can manage endpoint devices 122 and customer site C 130 can manage endpoint devices 132. Communication between the cloud service 103 and each customer site (e.g., 110, 120, 130) can be enabled through a client application on the cloud service 103 and an agent application in each customer site (e.g., 110, 120, 130) communicating via the network 106.

The IT department of customer site A 110 can perform functions on the endpoint devices 112 through the server 113. Similarly, endpoint devices 122 and 132 can be managed by IT departments of customer site B 120 and IT department of customer site C 130 through servers 123 and 133, respectively. An endpoint device can be any computing device, such as a laptop, desktop, virtual machine, tablet, smartphone, etc. that is used by an end user on the enterprise network. The cloud service 103 can be enabled by one or more computing devices that are remotely located with respect to the customer sites 110, 120, 130. The cloud service 103 can communicate with customer sites 110, 120, 130 through servers 105. Network 106 may further include numerous other components, such as one or more firewalls, connection brokers, management servers, etc.

In various embodiments, the cloud service 103 can provide a catalog of various application recipes 107. Any application recipes can be conveyed from the cloud service 103 to customer sites (e.g., 110, 120, 130). At the customer site (e.g., 110, 120, 130), the application recipes can be used to generate application deltas based on the application recipes. For example, each customer site (e.g., 110, 120, 130) can contain a central store (151, 152, 153) that stores copies of content of a plurality of endpoint devices (e.g., endpoint devices 112, 122, 132) managed by the customer site (e.g., 110, 120, 130), including the content of all files, registries, and lists of applications installed on these endpoints. Such central stores (151, 152, 153) may be maintained at the customer sites (e.g., 110, 120, 130) for backup purposes, for example. The system can determine whether each component identified in the application recipe is available in the customer site's (e.g., 110, 120, 130) central store (151, 152, 153). Subsequently, an application delta or package can be produced by retrieving all components identified in the application recipe from the central store (151, 152, 153). The application delta or package can then be used by the customer site (e.g., 110, 120, 130) to install the corresponding application on end user devices (e.g., 112, 122, 132) or to perform other IT operations related to the corresponding application.

In various embodiments, application recipes can be generated at the cloud service 103 based on information obtained from customer sites (e.g., 110, 120, 130) or from other sources. For example, customer sites (e.g., 110, 120, 130) may have silent installers for certain applications that the IT departments of the customer sites (e.g., 110, 120, 130)

developed or that were otherwise obtained by the customer site (e.g., 110, 120, 130). Such silent installers may be conveyed to the cloud service 103 from the customer sites (e.g., 110, 120, 130) and used to produce application recipes for the respective applications.

Figure 2:
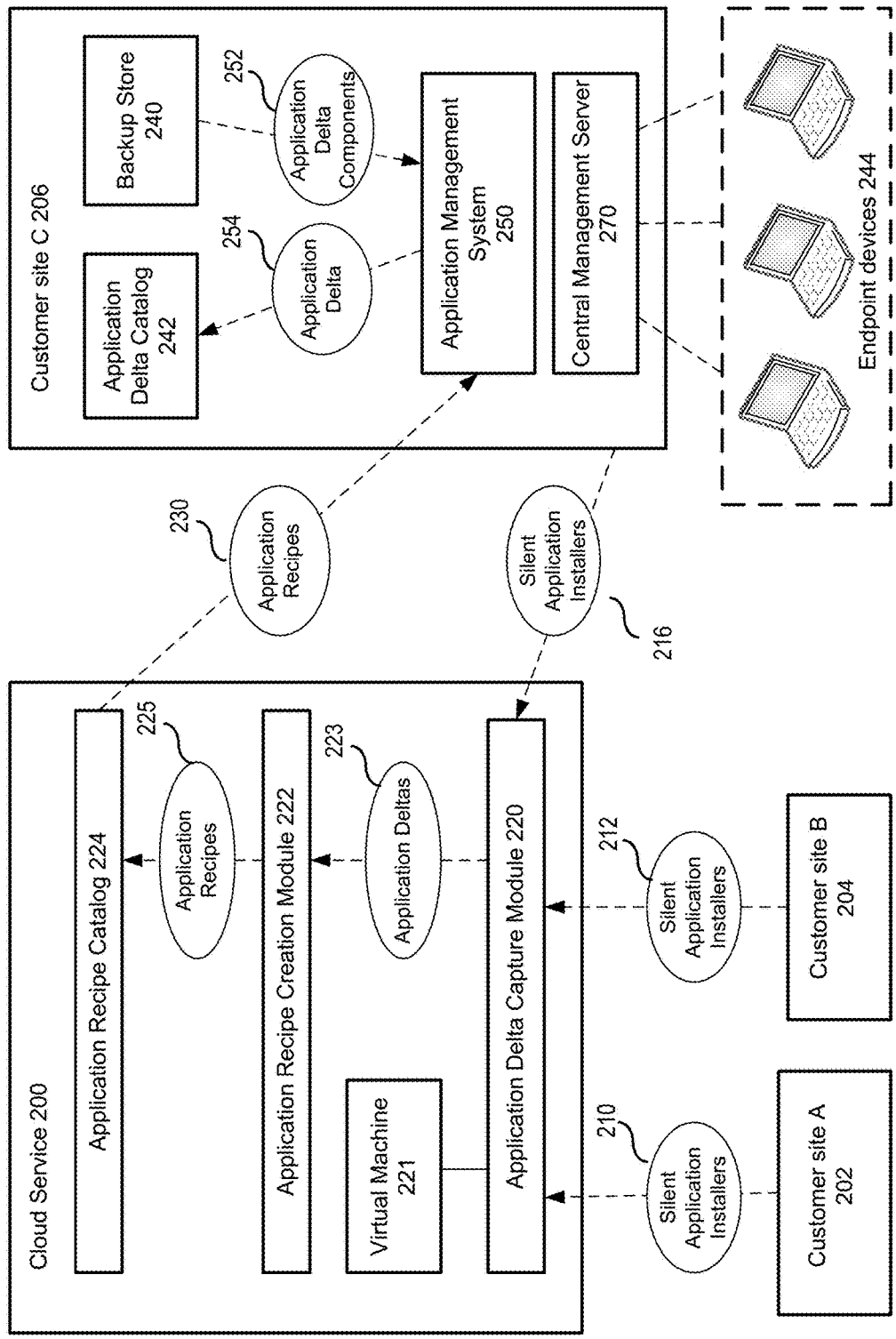
FIG. 2 illustrates an example block diagram of a system for recipe-based application management, in accordance with various embodiments.

FIG. 2 illustrates an example block diagram of a system for recipe-based application management, in accordance with various embodiments. As illustrated in the example of FIG. 2, a cloud service 200 is connected to customer site A 202, customer site B 204, and customer site C 206 through a network. Each customer site (e.g., 202, 204, 206) can be an organization, enterprise, or department that centrally manages a plurality of endpoint devices as part of an enterprise network. For example, customer site C 206 can manage endpoint devices 244 through a central management server 270 that communicates with each of the endpoint devices 244 via a network. An application management system 250 can manage applications in customer site C 206, such as by deploying, updating, and removing applications as will be described further below. The application management system 250 enabled by one or more computing devices. In various embodiments, the IT department of customer site C 206 can access the application management system 250 (e.g., through a user interface) to carry out various functions on the endpoint devices 244.

For purposes of illustration, customer site C 206 is illustrated in expanded view with connected endpoint devices 244 that are managed by customer site C 206. Other customer sites in the system (e.g., 202, 204) may include components and be connected to endpoint devices similarly to customer site C 206, which is not illustrated in FIG. 2.

Silent application installers 210, 212, 216 can be conveyed from customer site A 202, customer site B 204, and customer site C 206 to the cloud service 200. An application delta capture module 220 in the cloud service 200 can receive the silent application installers 210, 212, 216 and capture application deltas based on the silent application installers 210, 212, 216. For example, the application delta capture module 220 can capture an application delta for an application by using a silent application installer obtained from a customer site (e.g., 202, 204, 206) to install the application on a computing device, such as a virtual machine 221, capture a pre- and post-installation snapshot of the computing device, and compare the snapshots to produce an application delta. Application deltas 223 produced by the application delta capture module 220 can be conveyed to an application recipe creation module 222. The application recipe creation module 222 can produce application recipes for respective applications based on the application deltas. For example, the application recipe creation module 222 can create unique identifiers for the components of the application delta, such as by calculate checksums of the file names and content, registry entries and their data, or other components of the application delta. An application identifier can also be included in the application recipe. Accordingly, each application recipe includes unique identifiers of the content of the application delta as well as an application identifier, without containing any or most of the actual content of the files, registry entries, or other components of the application. Once an application delta has been converted into an application recipe, the original silent application installer (e.g., 210, 212, 216) can be disposed of. One advantage of disposing of original silent application installers (e.g., 210, 212, 216) is that it can avoid storing any customer site (e.g., 202, 204, 206) private data.

In an embodiment, a customer site (e.g., 202, 204, 206) may contain or may generate application deltas for certain applications. For example, if the customer site (e.g., 202, 204, 206) uses application management software that generates application deltas. In such cases, the application deltas can be converted to application recipes at the customer site (e.g., 202, 204, 206), instead of in the application recipe creation module 222. Subsequently, the application recipe can be uploaded to the cloud service 200. For example, a customer (e.g., 202, 204, 206) may have an application delta that contains a set of files, registry entries, and other OS modifications for an application installation. Unique identifiers, such as checksums, can be generated from these components of the application delta and uploaded to the cloud service 200, along with an application identifier, as an application recipe for the application.

In yet another embodiment, an application recipe can be generated at a customer site (e.g., 202, 204, 206) based on a silent application installer, instead of in the cloud service 200. Subsequently, the application recipe can be uploaded to the cloud service 200. In this embodiment, a customer site (e.g., 202, 204, 206) containing a silent application installer can generate an application delta based on the silent application installer, for example, by setting up a virtual machine, installing the application on the virtual machine, and capturing the delta as described elsewhere in this specification. The application delta can then be used to produce an application recipe and the application recipe can be uploaded to the cloud service 200.

Application recipes 225 generated by the application recipe creation module 222 can be conveyed to and stored in an application recipe catalog 224. Similarly, application recipes uploaded to the cloud service 200, such as recipes developed at a customer site (e.g., 202, 204, 206) as described above, can be stored in the application recipe catalog 224. In various embodiments, each recipe can be associated with an application identifier, or an application identifier can be made part of the application recipe, so that the system can determine the exact application that the application recipe corresponds to.

In various embodiments, a customer site (e.g., 202, 204, 206) may have various existing silent application installers for managing applications of endpoint devices. Such silent installers may be part of or be used by the customer site's (e.g., 202, 204, 206) ESD tools. Generally, many ESD systems include application catalogs of application packages that contain information used by the ESD system to perform its functions. For example, in some ESD systems, application catalogs contain application packages that include a file folder with installer files and a command line for launching the silent installation process. Additionally, application packages in application catalogs of an ESD system may include a file, such as an XML file, describing the application, its version, its upgrade code, etc. This information, when present, can be used to retrieve silent installers for applications from the ESD systems of customer sites (e.g., 202, 204, 206). Accordingly, the system can include a tool that uploads silent installers from customer sites (e.g., 202, 204, 206) to the application cloud service 200.

In various embodiments, the system is configured such that a customer site (e.g., 202, 204, 206) never receives private information of another customer site (e.g., 202, 204, 206) by never uploading or never saving file names, registry entry names, or other application content into the cloud service 200. For example, only digital signatures can be saved. Accordingly, customer site (e.g., 202, 204, 206) privacy is protected. Furthermore, the cloud service 200 can store the application information anonymously; without relating a specific application recipe to a specific customer site (e.g., 202, 204, 206).

After the application recipe catalog 224 in the cloud service 200 is populated, the application recipes can be used by customer sites (e.g., 202, 204, 206) to generate application deltas and application packages. As illustrated in the example of FIG. 2, application recipes 230 can be conveyed from the cloud service 200 to the application management system 250 in customer site C 206 for generating application deltas and packages based on the recipes 230. For example, application management system 250 can download all application recipes in the application recipe catalog 224. Alternatively, application management system 250 can download only certain application recipes from the application catalog 224, such as application recipes whose identifier exist in the a backup store 240 of customer site C 206, or application recipes that are specifically requested by customer site C 206.

The backup store 240 in customer site C 206 can contain backup copies of the content of endpoint devices 244. In various embodiments, it is sufficient for the backup store 240 to contain only the "system" component of each endpoint 244, without any user-specific data (such as the Windows user profiles). Thus, a system-only upload may only upload OS and application files to the backup store 240. Because the system components are largely identical for multiple endpoints, using deduplication techniques (as done with the VMware Inc. Mirage system) makes the upload faster and also eliminates storing private data in the central backup store 240, which consumes a lot of space. The "system components" are sufficient to translate application recipes to deltas.

As part of the endpoint 244 system upload to the backup store 240, the system can also upload the list of applications installed in each endpoint 244, including an application identifier of each application. In an embodiment, the system can continuously backup each endpoint 244, so the backup store 240 will always have all the files and application identifiers of every new application or application version that is installed on any endpoint device 244.

In various embodiments, application management system 250 can generate an application delta for a corresponding application based on an application recipe 230 received from the cloud computing module 200. Namely, application management system 250 can locate each component identified by the application recipe 230, and retrieve the components 252 from the backup store 240 to produce the application delta. For example, for each checksum identifying a component in the application recipe, the application management system 250 can search in its storage for a component, such as file names or registry entries, with a matching corresponding checksum. Components can be searched for, located in, and retrieved from the backup store 240. Namely, because the backup store contains copies of contents of all endpoint devices 244, the backup store 240 will contain the necessary files for an application recipe as long as at least one of the endpoint devices 244 has, at some point, installed the application.

In various embodiments, the system may search in other locations or storages for application recipe components. For example, the system may have databases with application files other than applications that have been installed on endpoint devices (e.g., 244), such as the ESD application catalog mentioned above, etc. In another embodiment, the system can search for application recipe components directly on endpoint devices (e.g., 244).

Further, the application management system 250 can use application identifiers that are located in application recipes 230 to locate application recipe 230 contents. For example, the application management system 250 can read the application identifier in a received application recipe 230 and locate the application in the backup store 240 based on the identifier. Similarly, the application management system 250 can identify which of the endpoint devices 244 the application may be located on. Thereafter, the application management system 250 can retrieve the application recipe 230 components either from the backup store 240 or from the endpoint device 244. Similarly, the application management system 250 can compare a component with multiple sources (e.g., with both backup store 240 and endpoint device 240) to ensure a match.

In an embodiment, after application management system 250 receives an application recipe 230, it compares the checksums in the application recipe 230 with the checksums of file names and registry entries in an endpoint (e.g., one of endpoint devices 244) that contained the same application. This can be done on the endpoint (e.g., one of endpoint devices 244) itself or in the backup store 240. It should be noted that all endpoint 244 files and registry entries are already available locally in the backup store 240, as they were previously uploaded from the endpoints 244 for backup purposes.

In various embodiments, for each checksum in the application recipe, the system checks if a corresponding entry with the same checksum exists in the endpoint (e.g., one of endpoint devices 244). If all entries are found, a new application delta is created (using the file content and registry content from that specific endpoint). Thus, the application management system 250 will only create application deltas for applications that already fully existed in the organization on some endpoint 244 and that matched an application recipe. This may be important to an organization to avoid violations of licenses.

In some cases, such as where checksums of file or registry names are used for component identification, techniques can be used to ensure that a component with a matched checksum is in fact the correct component. For example, in rare cases, an application's content in an endpoint (e.g., one of endpoint devices 244) that is selected for retrieving recipe components might not be working properly because of a corrupted file (when multiple endpoints 244 contain the application, an endpoint (e.g., one of endpoint devices 244) is chosen randomly). To reduce the probability of wrong or corrupted components being used in application deltas, the system can also verify that for some files (e.g. executable files), the version or content checksum is the same both in the application recipe and in the selected endpoint.

In various embodiment, operation of the application management system 250 avoids potential issues with user privacy. For example, the application management system 250 can be configured such that a source endpoint (e.g., one of endpoint devices 244) that contributes components such as file or registry content to produce an application delta is not at risk of exposing user private data to other endpoints (e.g., another one of endpoint devices 244) that receive the application delta. For example, the application delta capture module 220 can filter user profile data (e.g. files under c:\users or registry entries in the user hive). Therefore, application recipes only contain global system-wide paths and no user profile paths. If an application saved private user data in a global system-wide path, this application exposes the issue to a privacy issue regardless of the suggested mechanism, as other users on the machine can read this private user data. Also, the mechanism can be configured to never use files or registry entries that have security descriptors (ACLs) relating to a specific user entity.

Further, when application management system 250 detects that a new application or application version is available in the backup store 240 (e.g., based on an application identifier uploaded from an endpoint device 244), which may result from a user installing the new application on an endpoint device 244, it can check if the cloud service 200 contains an application recipe for the application; for example, by comparing the application identifier. If an application recipe exists in the cloud service 200, the application recipe can be downloaded from the cloud service 200 and an application delta can be produced based on the received application recipe 230. Subsequently, the application delta 254 can be conveyed to and stored in the application delta catalog 242.

After populating the application delta catalog 242 with numerous application deltas 254, the deltas can be used for various purposes. Application deltas allow IT to deliver an application onto any endpoint 244 in a quick, seamless, and unassisted fashion by merging the application delta onto the endpoint 244. This enables robust deployment of applications on physical or virtual endpoints 244, initiated by IT or by users via a self-service portal. Merging application deltas can deploy applications with very little user down time, in a WAN-optimized manner that supports mobile users.

Further, application deltas are also useful for fixing broken applications. IT can fix and enforce application versions by applying a corresponding application delta on endpoints with the broken application. This will restore any damaged files, registry, or other system components with the ones from the application delta. Further, Application deltas will allow application installation even in cases where a standard MSI installation would fail. This is possible because when deploying applications, an application delta is merged into the system instead of going through the traditional, long MSI installation process that may contain executable scripts that may fail.

In various embodiments, the system can continuously maintain a list of which application deltas (from the catalog 242) are installed on which endpoint device 244. As soon as new application deltas are available in the application delta catalog 242, the system can automatically mark the matching endpoint as having these application deltas installed, by comparing application identifiers. IT can then fix applications that become broken, enforce a specific version of an application, automatically or manually upgrade applications to newer versions (when a newer version is populated in the catalog) and force application uninstallation.

Another use case for application deltas is the provisioning of new physical machines or the migration of existing machines to newer operating system versions. In this case, IT would prefer to provision not only an OS image, but also to provide the user with critical applications. Traditional OS migration does not automatically migrate user-installed applications. However, with application deltas and with the automatic population of the application delta catalog, the system can automatically match the user's applications on her old endpoint or old operating system with the same applications for her new endpoint, saving most of the time during OS migration projects.

Accordingly, the systems and methods described herein provide numerous advantages to IT departments of organizations. Firstly, an IT department is able to generate a catalog of application deltas, which can be used by the IT department to perform various operations on endpoint devices, instantly and automatically. Secondly, because a recipe can identify components of an application without including any actual contents of the components, the risk of license violation is avoided, since the actual components are obtained from within the organization during generation of application deltas.

Figure 3:
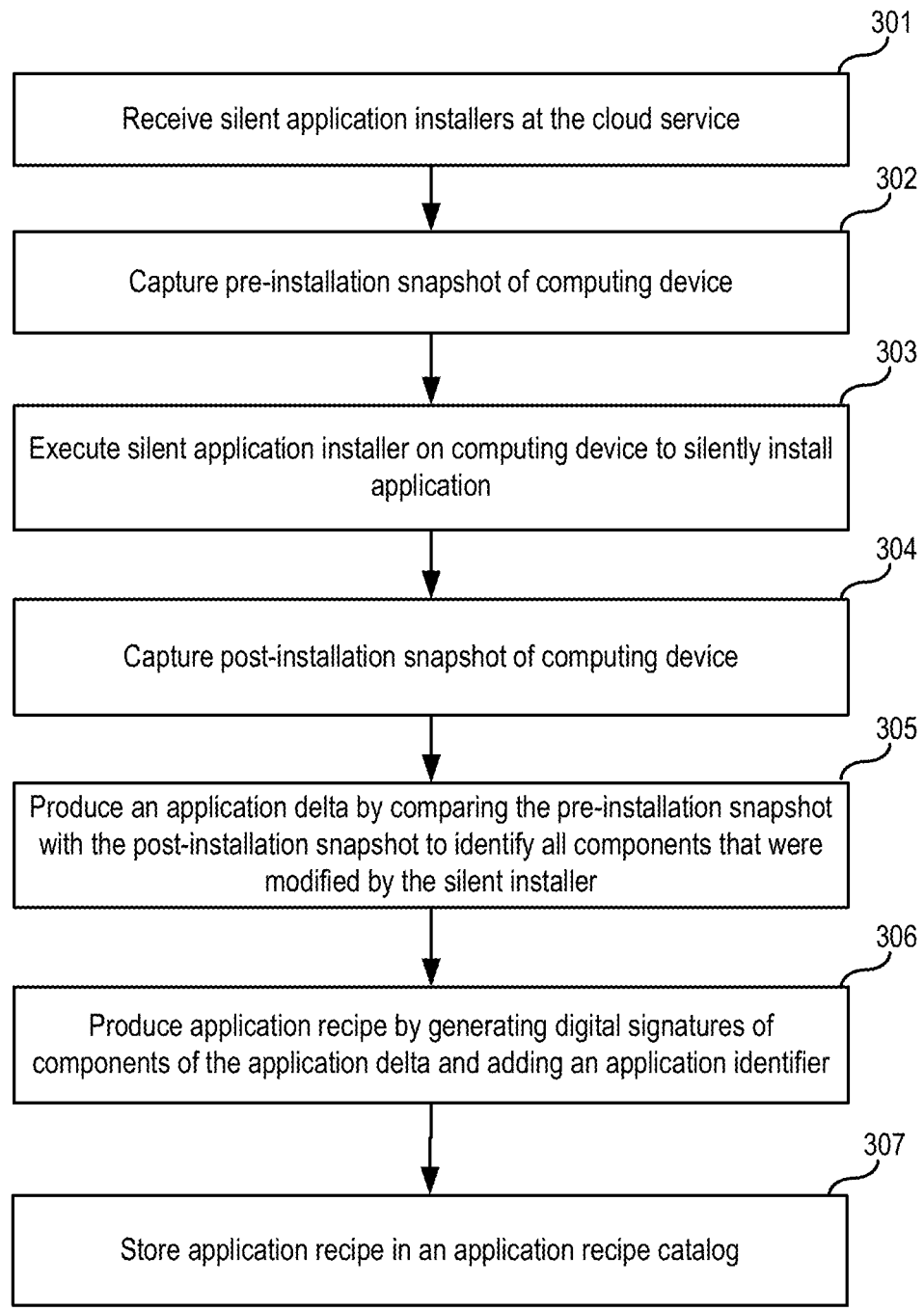
FIG. 3 illustrates an example process flow for creating application recipes, in accordance with various embodiments.

FIG. 3 illustrates an example process flow for creating application recipes, in accordance with various embodiments. In various embodiments, the example process of FIG. 3 can be implemented by a cloud service, such as the cloud service 200 of FIG. 2, to create application recipes. Silent application installers can be received at the cloud service 301. The silent application installers can be obtained from the IT systems of connected enterprise organizations or other sources, such as application vendors. A pre-installation snapshot of a computing device, such as a virtual machine, can be captured 302. The silent application installer can be executed on the computing device to silently install the application 303. A post-installation snapshot of the computing device can be captured 304. Subsequently, the system can produce an application delta by comparing the pre-installation snapshot with the post-installation snapshot to identify all components that were modified by the silent installer 305. An application recipe can then be produced by generating digital signatures of components of the application delta, such as checksums of file and registry names, and adding an application identifier 306. Finally, the application recipe can be stored in an application recipe catalog 307, from where it can be retrieved when needed. The silent application installer can be discarded to avoid any risks associated with keeping the enterprise organization files in the cloud.

Figure 4:
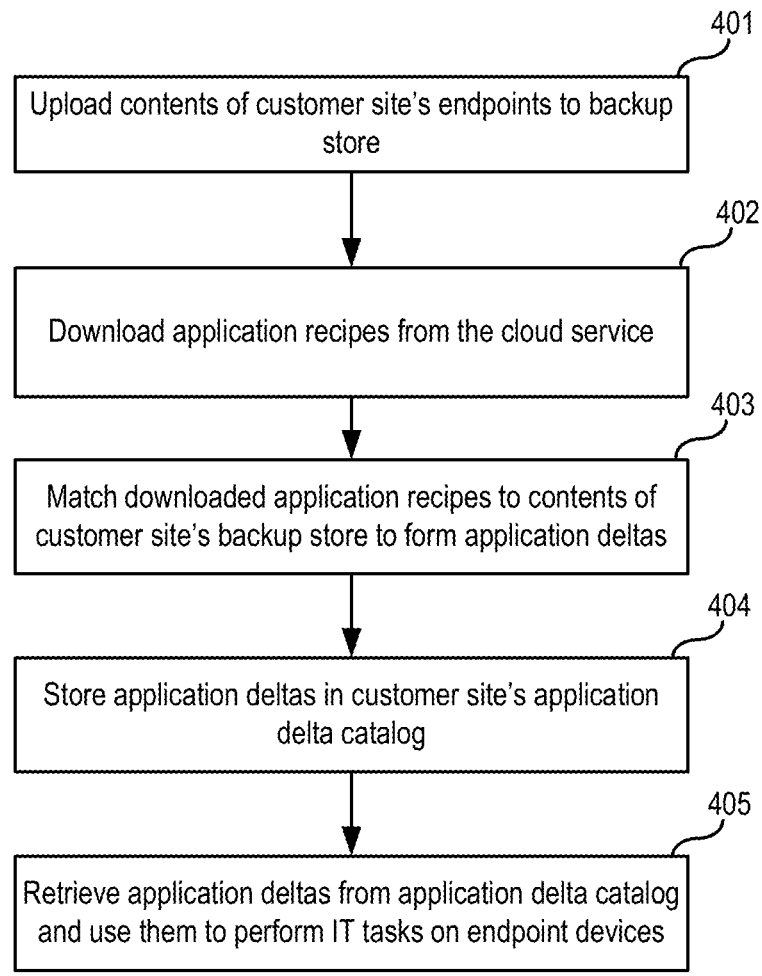
FIG. 4 illustrates an example process flow for creating an application delta based on an application recipe at a customer site, in accordance with various embodiments.

FIG. 4 illustrates an example process flow for creating an application delta based on an application recipe at a customer site, in accordance with various embodiments. In various embodiments, the example process of FIG. 4 can be implemented at a customer site, such as the customer site C 206 of FIG. 2, to create application deltas. The system can upload the contents of a customer site's endpoints to a backup store 401. The backup store can be a central backup server of the customer site. For example, this function can be performed as part of a continuous backup operation in the organization's enterprise network. Application recipes can be downloaded to the customer site from the cloud service 402. For example, all available recipes can be downloaded, or a subset of recipes that are relevant to the customer site's organization may be downloaded, or recipes may be downloaded in response to a request from the customer site for a specific recipe (e.g., when a new application or version of an application is found on an endpoint device). Subsequently, the downloaded application recipes can be matched to contents of the customer site's backup store to form application deltas 403. For example, for each application recipe, the system can identify which application the recipe is for based on an application identifier included in the application recipe. Then, the system can locate an endpoint device in the backup store that contains the application. To enable this, the backup store keeps an updated record of application identifiers on endpoint devices. Once the application is located in the backup store, the components required by the application recipe can be retrieved to generate an application delta. Alternatively, the store can include only the component identifiers (without their content), and the component itself is retrieved from the endpoint device via the enterprise network. The application deltas are stored in the customer site's application delta catalog 404. Subsequently, the application deltas can be retrieved from the application delta catalog and used to perform IT tasks on endpoint devices 405, such as installing applications, uninstalling applications, fixing applications, migrating users to new devices, etc.

Figure 5:
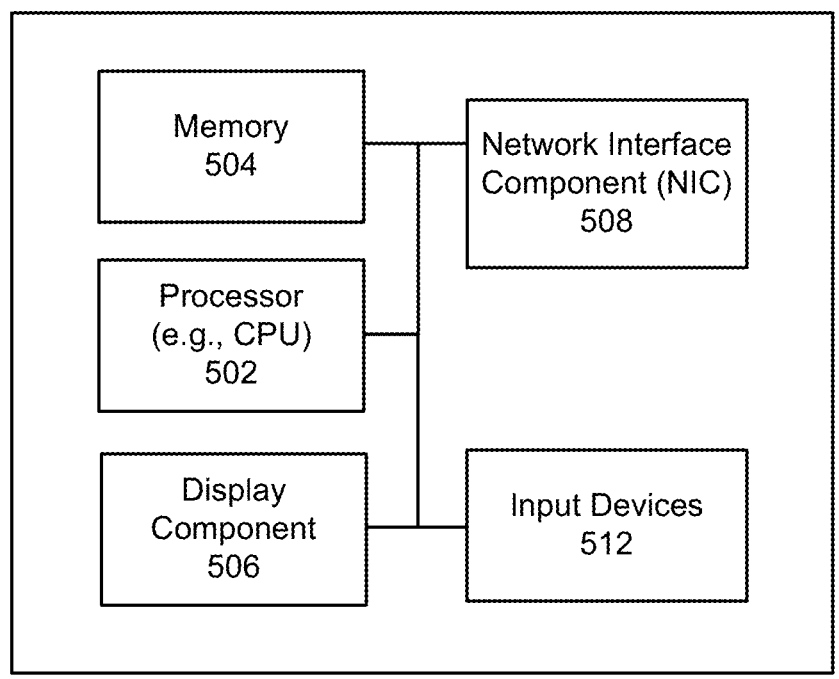
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in physical memory component 504. The memory component 504 can include many types of memory, data storage, or non-transitory computer-readable storage media, such as random access memory (RAM) storing program instructions for execution by the processor 502, a separate form of storage for images or data, a removable memory for sharing information with other devices and the like. The computing device typically can further comprise a display component 506, such as a monitor, a touch screen, liquid crystal display (LCD), or the like. In various embodiments, the computing device will include at least one input device 512 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 508 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktops, laptop computers, or virtual machines running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for providing an application management cloud service, implemented on a cloud service server, comprising:

maintaining a catalog of application recipes for building application deltas on the cloud service server, each application recipe in the catalog comprising a plurality of unique identifiers, each unique identifier identifying a different component of a corresponding application delta without containing the contents of the component, wherein each of the application deltas corresponds to changes produced on a computing device by installation of a corresponding application such that merging the application delta onto a target computing device installs the corresponding application;

receiving a request at the cloud service server for an application recipe corresponding to a requested application from an application management system running on a remote computing device;

determining whether the requested application recipe is available in the catalog; and in response to determining that the requested application recipe is available in the catalog, retrieving and conveying the requested application recipe to the application management system.

2. The method of claim 1, further comprising:
generating the requested application recipe by:
obtaining an application delta for the requested application;
identifying a plurality of components of the obtained application delta;
producing a unique identifier for each of the identified components;
including the produced unique identifiers in the generated requested application recipe while omitting the contents of the components; and
storing the generated requested application recipe in the catalog.

3. The method of claim 2, wherein the obtained application delta is produced by:
capturing a pre-installation snapshot of a virtual machine;
executing a silent installer associated with the requested application on the virtual machine;
capturing a post-installation snapshot of the virtual machine; and
comparing the pre-installation snapshot with the post-installation snapshot to determine changes produced by the silent installer.

4. The method of claim 1, wherein the application management system is configured to build an application delta based on the requested application recipe by:
receiving the requested application recipe from the cloud service server;
locating the components of the application delta based on the unique identifiers in the received requested application recipe; and
combining at least the located components to build the application delta.

5. The method of claim 4, wherein:
the application management system is on a central management server configured to centrally manage a plurality of endpoints and to merge the built application delta onto at least one of the endpoints to install the application on the endpoint.

6. The method of claim 1, wherein the application delta comprises files, registry entries, and operating system changes produced by an installation of the application.

7. The method of claim 1, wherein the unique identifiers are digital signatures of the components that they identify.

8. A computing device, comprising:
at least one processor; and
memory including instructions that, when executed by the at least one processor, cause the computing device to perform the steps of:
maintaining a catalog of application recipes for building application deltas on the cloud service server, each application recipe in the catalog comprising a plurality of unique identifiers, each unique identifier identifying a different component of a corresponding application delta without containing the contents of the component, wherein each of the application deltas corresponds to changes produced on a computing device by installation of a corresponding application such that merging the application delta onto a target computing device installs the corresponding application;

receiving a request at the cloud service server for an application recipe corresponding to a requested application from an application management system running on a remote computing device;

determining whether the requested application recipe is available in the catalog; and in response to determining that the requested application recipe is available in the catalog, retrieving and conveying the requested application recipe to the application management system.

9. The computing device of claim 8, wherein the memory further includes instructions that when executed by the at least one processor, cause the computing device to perform the steps of:
generating the requested application recipe by:
obtaining an application delta for the requested application;
identifying a plurality of components of the obtained application delta;
producing a unique identifier for each of the identified components;
including the produced unique identifiers in the generated requested application recipe while omitting the contents of the components; and
storing the generated requested application recipe in the catalog.

10. The computing device of claim 9, wherein the obtained application delta is produced by:
capturing a pre-installation snapshot of a virtual machine;
executing a silent installer associated with the requested application on the virtual machine;
capturing a post-installation snapshot of the virtual machine; and
comparing the pre-installation snapshot with the post-installation snapshot to determine changes produced by the silent installer.

11. The computing device of claim 8, wherein the application management system is configured to build an application delta based on the requested application recipe by:
receiving the requested application recipe from the cloud service server;
locating the components of the application delta based on the unique identifiers in the received requested application recipe; and
combining at least the located components to build the application delta.

12. The computing device of claim 11, wherein:
the application management system is on a central management server configured to centrally manage a plurality of endpoints and to merge the built application delta onto at least one of the endpoints to install the application on the endpoint.

13. The computing device of claim 8, wherein the application delta comprises files, registry entries, and operating system changes produced by an installation of the application.

14. The computing device of claim 8, wherein the unique identifiers are digital signatures of the components that they identify.

15. A non-transitory computer readable storage medium comprising one or more sequences of instructions, the instructions when executed by one or more processors causing the one or more processors to execute the operations of:
maintaining a catalog of application recipes for building application deltas on the cloud service server, each application recipe in the catalog comprising a plurality of unique identifiers, each unique identifier identifying a different component of a corresponding application delta without containing the contents of the component, wherein each of the application deltas corresponds to changes produced on a computing device by installation of a corresponding application such that merging the application delta onto a target computing device installs the corresponding application;
receiving a request at the cloud service server for an application recipe corresponding to a requested application from an application management system running on a remote computing device;
determining whether the requested application recipe is available in the catalog; and
in response to determining that the requested application recipe is available in the catalog, retrieving and conveying the requested application recipe to the application management system.

16. The non-transitory computer readable storage medium of claim 15, further comprising instructions that when executed by the one or more processors cause the one or more processors to execute the operations of:
generating the requested application recipe by:
obtaining an application delta for the requested application;
identifying a plurality of components of the obtained application delta;
producing a unique identifier for each of the identified components;
including the produced unique identifiers in the generated requested application recipe while omitting the contents of the components; and
storing the generated requested application recipe in the catalog.

17. The non-transitory computer readable storage medium of claim 16, wherein the obtained application delta is produced by:
capturing a pre-installation snapshot of a virtual machine;
executing a silent installer associated with the requested application on the virtual machine;
capturing a post-installation snapshot of the virtual machine; and
comparing the pre-installation snapshot with the post-installation snapshot to determine changes produced by the silent installer.

18. The non-transitory computer readable storage medium of claim 15, wherein the application management system is configured to build an application delta based on the requested application recipe by:
receiving the requested application recipe from the cloud service server;
locating the components of the application delta based on the unique identifiers in the received requested application recipe; and
combining at least the located components to build the application delta.

19. The non-transitory computer readable storage medium of claim 18, wherein:
the application management system is on a central management server configured to centrally manage a plurality of endpoints and to merge the built application delta onto at least one of the endpoints to install the application on the endpoint.

20. The non-transitory computer readable storage medium of claim 15, wherein the application delta comprises files, registry entries, and operating system changes produced by an installation of the application.

* * * * *